(12) United States Patent
Curtis

(10) Patent No.: US 9,633,401 B2
(45) Date of Patent: Apr. 25, 2017

(54) METHOD TO IDENTIFY HEATING AND COOLING SYSTEM POWER-DEMAND

(71) Applicant: Opower, Inc., Arlington, VA (US)

(72) Inventor: Richard Tyler Curtis, Washington, DC (US)

(73) Assignee: OPower, Inc., Arlington, VA (US)

( * ) Notice: Subject to any disclaimer, the term of this patent is extended or adjusted under 35 U.S.C. 154(b) by 815 days.

(21) Appl. No.: 13/839,082

(22) Filed: Mar. 15, 2013

(65) Prior Publication Data

US 2014/0107850 A1  Apr. 17, 2014

Related U.S. Application Data

(60) Provisional application No. 61/713,740, filed on Oct. 15, 2012, provisional application No. 61/722,445, filed on Nov. 5, 2012.

(51) Int. Cl.
| | |
|---|---|
| *G06Q 50/06* | (2012.01) |
| *F24F 11/00* | (2006.01) |
| *H02J 3/00* | (2006.01) |
| *H02J 13/00* | (2006.01) |

(52) U.S. Cl.
CPC .......... *G06Q 50/06* (2013.01); *F24F 11/001* (2013.01); *H02J 3/00* (2013.01); *H02J 13/001* (2013.01); *F24F 2011/0047* (2013.01); *F24F 2011/0063* (2013.01); *H02J 2003/007* (2013.01); *Y04S 10/40* (2013.01)

(58) Field of Classification Search
CPC .......... F24F 11/001; F24F 2011/0047; F24F 2011/0063; G06Q 50/06; H02J 3/00

USPC ........................................................ 700/291
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | 364/550 |
| 5,513,519 A | 5/1996 | Cauger et al. | 73/112 |
| 5,566,084 A | 10/1996 | Cmar | 364/492 |
| 5,717,609 A | 2/1998 | Packa et al. | 364/557 |
| 5,855,011 A | 12/1998 | Tatsuoka | |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

Sen et al. "Regression Analysis Theory, Methods, and Applications", 1990.*

(Continued)

*Primary Examiner* — Kenneth M Lo
*Assistant Examiner* — Yuhui R Pan

(57) ABSTRACT

Methods and computer systems are disclosed for identifying the power-demand of a climate-control system at a premises to reduce usage of energy at the premises. A computer system receives energy usage data and run-time data of the climate-control system. The operational data includes an on-time and/or off-time associated with the climate-control system. The computer system determines a power-draw of the climate-control system using the energy usage data and the run-time data and outputs the power-draw to be used to reduce the energy usage at the premises.

15 Claims, 10 Drawing Sheets

(56) References Cited

U.S. PATENT DOCUMENTS

| | | |
|---|---|---|
| 5,873,251 A | 2/1999 | Iino .................. 60/660 |
| 5,930,773 A | 7/1999 | Crooks et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| 6,539,736 B1* | 4/2003 | Isazawa et al. ............. 62/175 |
| 6,701,298 B1 | 3/2004 | Jutsen |
| 6,732,055 B2 | 5/2004 | Bagepalli et al. |
| 6,778,945 B2 | 8/2004 | Chassin et al. ............ 702/188 |
| 6,785,620 B2 | 8/2004 | Kishlock et al. ........... 702/61 |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. ............. 700/300 |
| 7,243,044 B2 | 7/2007 | McCalla .................. 702/182 |
| 7,333,880 B2 | 2/2008 | Brewster et al. |
| 7,356,548 B1 | 4/2008 | Culp et al. |
| 7,444,251 B2 | 10/2008 | Nikovski et al. ........... 702/81 |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam .................. 702/62 |
| 8,166,047 B1 | 4/2012 | Cohen et al. |
| 8,180,591 B2 | 5/2012 | Yuen et al. |
| 8,239,178 B2 | 8/2012 | Gray et al. .............. 703/2 |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| 8,751,432 B2 | 6/2014 | Berg-Sonne et al. |
| 8,805,000 B2 | 8/2014 | Derby et al. |
| 9,031,703 B2 | 5/2015 | Nakamura et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0073537 A1* | 4/2004 | Thiesson et al. ........... 707/2 |
| 2004/0111410 A1 | 6/2004 | Burgoon et al. |
| 2004/0140908 A1 | 7/2004 | Gladwin et al. |
| 2005/0040247 A1* | 2/2005 | Pouchak ................ 236/44 C |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2007/0270994 A1* | 11/2007 | Dobson et al. ............ 700/121 |
| 2008/0027885 A1 | 1/2008 | van Putten et al. ......... 705/412 |
| 2008/0167535 A1 | 7/2008 | Stivoric et al. |
| 2008/0195561 A1 | 8/2008 | Herzig |
| 2008/0281473 A1 | 11/2008 | Pitt |
| 2008/0281763 A1 | 11/2008 | Yliniemi .................. 705/412 |
| 2008/0306985 A1 | 12/2008 | Murray et al. |
| 2009/0106202 A1 | 4/2009 | Mizrahi |
| 2009/0204267 A1 | 8/2009 | Sustaeta et al. |
| 2009/0326726 A1 | 12/2009 | Ippolito et al. |
| 2010/0025483 A1 | 2/2010 | Hoeynck et al. ........... 236/1 |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0286937 A1 | 11/2010 | Hedley et al. ............ 702/60 |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0055131 A1* | 3/2011 | Chen ..................... 706/25 |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. ............. 702/62 |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0190951 A1* | 8/2011 | Lee ..................... 700/291 |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. ............. 703/6 |
| 2012/0117503 A1* | 5/2012 | Hofrichter et al. ......... 715/772 |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0103656 A1* | 4/2013 | Sanchez Loureda et al. .................. 707/693 |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227846 A1 | 8/2015 | Mercer et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |

(56) References Cited

FOREIGN PATENT DOCUMENTS

| | | |
|---|---|---|
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

Bailey et al., *Fitting a Mixture Model by Expectation Maximization to Discover Motifs in Biopolymers*, UCSD Technical Report C594-351, Proceedings of the Second International Conf. on Intelligent Systems for Molecular Biology, 33 pages, 1994.

Chen et al., *Testing for a Finite Mixture Model with Two Components*, Journal of the Royal Statistical Society, Series B, vol. 66, No. 1, pp. 95-115, 2004.

Fels, *PRISM: An Introduction*, Energy and Buildings, vol. 9, pp. 5-18, 1986.

Fels et al., *Seasonality of Non-heating Consumption and Its effect on PRISM Results*, Energy and Buildings, vol. 9, pp. 139-148, 1986.

Goldberg et al., *Refraction of PRISM Results into Components of Saved Energy*, Energy and Buildings, vol. 9, pp. 169-180, 1986.

Jansen, *Maximum Likelihood in a Generalized Linear Finite Mixture Model by Using the EM Algorithm*, Biometrics, vol. 49, pp. 227-231, Mar. 1993.

Muthén et al., *Finite Mixture Modeling with Mixture Outcomes Using the EM Algorithm*, Biometrics, vol. 55, pp. 463-469, Jun. 1999.

Wikipedia, *Akaike information criterion*, 6 pages, Aug. 17, 2012.

Wikipedia, *Mixture model*, 10 pages, Oct. 7, 2012.

International Searching Authority, International Search Report—International Application No. PCT/US2010/055621, dated Dec. 23, 2010, together with the Written Opinion of the International Searching Authority, 11 pages.

International Searching Authority, International Search Report—International Application No. PCT/US2013/063210, dated Jan. 30, 2014, together with the Written Opinion of the International Searching Authority, 11 pages.

The International Bureau of WIPO, International Preliminary Report on Patentability—International Application No. PCT/US2010/055621, dated May 18, 2012, together with the International Preliminary Report on Patentability, 8 pages.

United States Patent and Trademark Office, Office Action, dated Feb. 13, 2013, pertaining to U.S. Appl. No. 12/940,447, 26 pages.

International Search Report and Written Opinion for PCT Application No. PCT/US2015/038692, mailed Sep. 24, 2015, 13 pages.

International Search Report and Written Opinion for PCT Application No. PCT/US2012/036539, mailed Jul. 6, 2012, 8 pages.

International Preliminary Report on Patentability for PCT Application No. PCT/US2012/036539, mailed Nov. 21, 2013, 7 pages.

International Search Report and Written Opinion for PCT Application No. PCT/US2013/046126, mailed Aug. 22, 2013, 9 pages.

International Preliminary Report on Patentability for PCT Application No. PCT/US2013/046126, mailed Jan. 8, 2015, 8 pages.

International Search Report for PCT Application No. PCT/US2014/036901, mailed Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/200807281616/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May, 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/caculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web./archive.org/web/20080229072420/www.nature.org/popups/misc/art20625.html.

De Prensa, Boletine, "TXU Energy Budget Alerts Give Consumers Control of Electricity Costs," TXU Energy, http://www.txu.com/es/about/press, 2 pages, May 23, 2012.

D'Urso, M., et al., "A Simple Strategy for Life Signs Detection Via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Friedman, Jerome, et al., "Regularization Paths for Generalized Linear Models via Coordinate Descent," Journal of Statistical Sotfware, vol. 33, Iss. 1, pp. 1-22, Jan. 2010.

Jawbone, "Know yourself. Live better." https://jawbone.com/up/, 7 pages, Jul. 15, 2013.

Mint.com, "Budgets you'll actually stick to," Budgeting-Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/, 2 pages, Jul. 12, 2013.

Mori, Hiroyuki, "State-of-the-Art Overview on Data Mining in Power Systems," IEEE, pp. 33-37, 2006.

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f..uelband, 7 pages, Jul. 15, 2013.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stoop, R., et al., "Calculation of Lyapunov exponents avoiding spurious elements," Physica D 50, pp. 89-94, May 1991.

(56) References Cited

OTHER PUBLICATIONS

Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data", Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Deb, "Finite Mixture Models," *Hunter College and the Graduate Center, CUNY NBER*, FMM Slides, 42 pages, Jul. 2008.
Leisch, "FlexMix: A General Framework for Framework for Mixture Models and Latent Class Regression," *Journal of Statistical Software*, http://www.jstatsoft.org/, vol. 11(8), pp. 1-18, Oct. 2004.
Liang et al., "Load Signature Study—Part I: Basic Concept, Structure, and Methodology," *IEEE Transactions on Power Delivery*, vol. 25, No. 2, pp. 551-560, Apr. 2010.
Liang et al., "Load Signature Study—Part II: Disaggregation Framework, Simulation, and Applications," *IEEE Transactions on Power Delivery*, vol. 25, No. 2, pp. 561-569, Apr. 2010.
Stephen et al., "Domestic Load Characterization Through Smart Meter Advance Stratification," *IEEE Transactions on Smart Grid*, Power Engineering Letter, vol. 3, No. 3, pp. 1571-1572, Sep. 2012.

\* cited by examiner

METHOD TO IDENTIFY HEATING AND COOLING SYSTEM POWER-DEMAND

RELATED APPLICATION

The present invention claims priority from Provisional Application No. 61/713,740, filed Oct. 15, 2012 and Provisional Application No. 61/722,445, filed Nov. 5, 2012. These applications are incorporated herein by reference.

TECHNICAL FIELD

The present invention relates to energy usage, and more particularly to identifying power-draw associated with energy usage for heating and cooling systems.

BACKGROUND ART

A climate-control system generally accounts for a substantial portion of energy usage within a commercial or residential building. Typically, a thermostat regulates the temperature and humidity within pre-defined controlled spaces of the premises using the climate-control system. Beside the climate-control system, other loads are present at the premises. These loads may include auxiliary or secondary environment-conditioning systems, such as window-based air-conditioning or space-heating units.

SUMMARY OF THE EMBODIMENTS

In an embodiment, a computer-implemented method of determining power-demand of a climate-control system to reduce energy usage is provided. The computer-implemented method includes receiving energy usage data of the premises and run-time data of the climate-control system. The computer-implemented method determines a power-draw of the climate-control system using the energy usage data and the run-time data and outputs the determined power-draw. The data may be in minute, hourly, daily, weekly, monthly, and seasonal increments.

The power-draw data may be compared to historical power-draw data. Upon a difference between the current power-draw and the historical power-draw exceeding a pre-specified value, the method may include causing a report to be sent to the consumer. In another embodiment, rather than comparing to historical data, another embodiment compares the power-draw information of a premises to another power-draw of another premises sufficiently similar to the premises.

According to an embodiment, the power-draw may be determined by correlating at least two energy usage datum of the energy usage data at a first and second time to at least two run-time datum at the first and second time. The resulting trend between the energy usage datum and the runtime datum may represent a power-draw of the climate-control system of the premises. The trend may be determined based on an estimation selected from a group including a least-square estimation, a generalized least-square estimation, an iteratively reweighted least-square estimation, a total least-square estimation, a maximum-likelihood estimation, a ridge-regression estimation, a least absolute deviation estimation, an adaptive estimation, a principal-component regression estimation, and a least-angle regression estimation.

In another embodiment, the power-draw is determined by $$\left(\frac{1}{n}\sum x_i x_i^T\right)^{-1}\left(\frac{1}{n}\sum x_i y_i\right),$$

where $x_i$ is a vector of the run-time data having n elements referenced by i; $x_i^T$ is the vector $x_i$ transposed; and $y_i$ is a vector of energy usage data having n elements and referenced by i.

In another embodiment, the power-draw may be determined by iteratively correlating additional usage datum of the energy usage data to additional corresponding run-time datum until improvements of the trend is below a pre-specified value. The improvement condition may include a coefficient of determination ($R^2$) derived from the correlation exceeding a pre-specified value.

In another embodiment, the method may further include verifying that the determined representative trend is accurate. As such, the method may include determining if the $R^2$ value of the trend is above a pre-defined threshold.

According to another embodiment, a premises includes a second climate-control system operating independently of the first climate-control system. The operation of determining the power-draw of a HVAC system may include determining a trend associated with a group of datum within the energy usage data correlated to the run-time data. The trend is associated with the power-draw of the first climate-control system. The operation may also include determining a presence of a second group of datum within the energy usage data not correlated to the run-time data.

According to another embodiment, a premises includes a second climate-control system operating independently of the first climate-control system. The operation includes determining a trend associated with a group of datum within the energy usage data correlated to the run-time data. Each datum of the energy usage data has a probability of membership associated with being in the group. The trend being determined in a manner that fits the probability of membership. The trend is associated with the power-draw of the first climate-control system.

According to another embodiment, the power-draw of the climate-control system may be determined by performing a finite mixture model analysis with at least one group of members. The method includes performing a second, or more, finite mixture model analysis to identify the existence of at least one additional group of members. The power-draw may be determined from between a first group and a second group determined from the analysis. The groups may be weighted or penalized, where the weight or penalty is associated to a number of additional groups of memberships.

The various embodiments may be employed to determine a climate-control system as well auxiliary environment conditions loads at the premises. Various stages of the climate-control system may also be determined.

According to another embodiment, a computer program product of the various embodiments of reducing energy usage by determining power-draw is disclosed. The computer-program product may be stored on a machine-readable medium, or computer data signal, embodied by an electromagnetic wave.

According to another embodiment, a system for reducing energy usage is provided. The system includes a memory configured to store i) energy usage data of a premises for a time period and ii) runtime data of a climate-control system of the premises for a portion of the time period. The system also includes a control program to control the memory and receive energy usage data of a premises and run-time data of a thermostat regulating the temperature at the premises. The system may determines the power-draw using the energy usage data and the run-time data.

BRIEF DESCRIPTION OF THE DRAWINGS

The foregoing features of embodiments will be more readily understood by references to the following detailed description, taken with reference to the accompanying drawings, in which.

DETAILED DESCRIPTION OF SPECIFIC EMBODIMENTS

Figure 1:
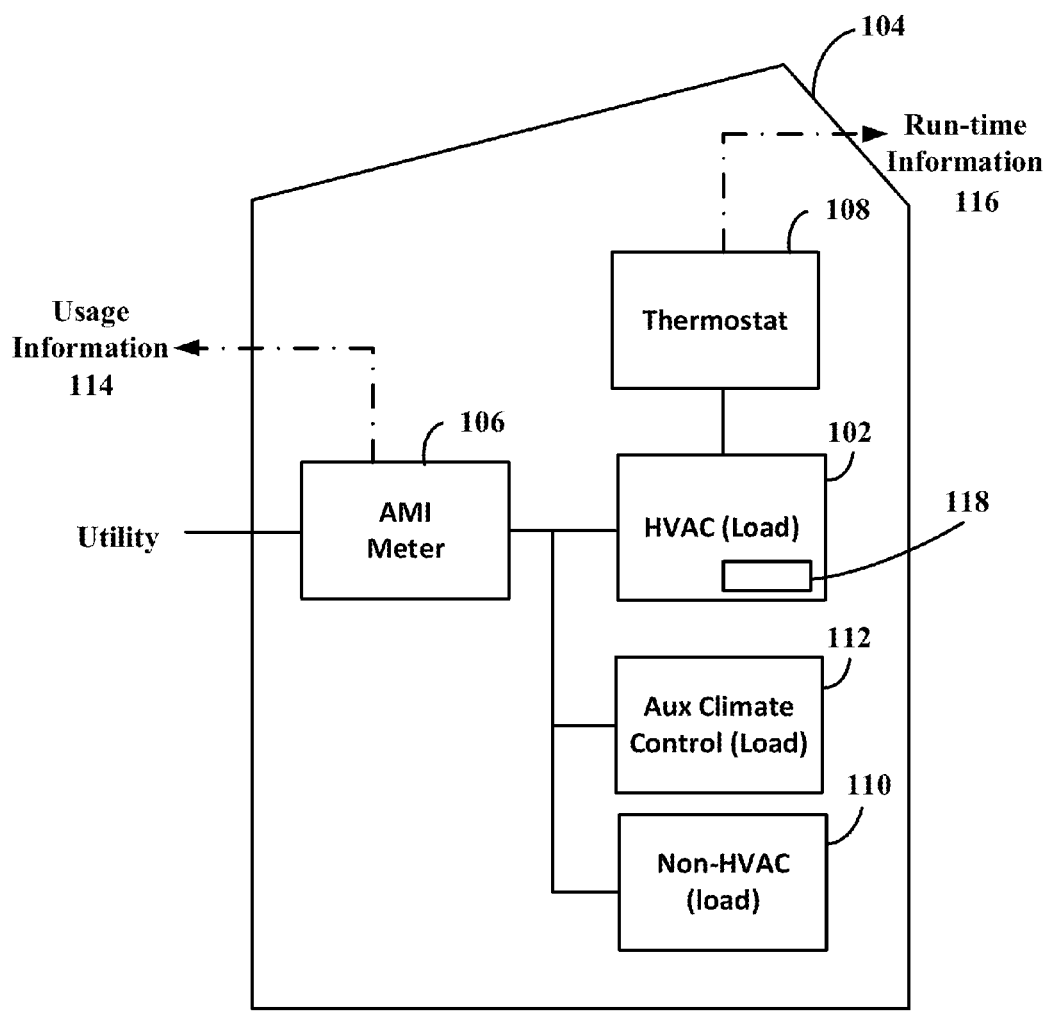
FIG. 1 schematically illustrates a premises according to an illustrative embodiment.

The terms "power-draw" and "power-demand" refer to a rate of energy consumption or usage for an electric system, as well as a fuel consuming system (e.g., a gas furnace). As used in this specification, the terms "power-draw" and "power-demand" are used interchangeably.

The term "climate-control system" refers to a system that controls the environmental conditions, such as temperature, humidity, ventilation, and air flow, of a premises. A climate-control system may be a heating-ventilation and air-conditioning (HVAC) system, as well as various other heating and cooling systems.

The term "premises" refers a place occupied by people having a controlled environmental condition, including a residential, a commercial, and an industrial building.

Power-draw information and other performance-related characteristics of a climate-control system have numerous benefits in the management, controls, and maintenance of heating and cooling systems at the premises. Though beneficial to have, ascertaining the information typically requires a degree of effort that may often outweigh the benefits. Typically, a building occupant would solicit the services of a professional contractor or installer to evaluate the HVAC system in his or her premises to determine if it is operating properly or optimally. To do so, the contractor may install sensors at various locations throughout the system to monitor its performance for a period of time. Using the collected data, the contractor may employ his or her specialized knowledge associated with specific climate-control systems, such as its expected operations within a given building structure, to ascertain whether the system is operating properly.

According to an illustrative embodiment, the power-draw information of climate-control system at a premises may be ascertained using information associated with energy usage at the premise and the run-time operation of the system. As such, the economic benefit of determining power draw for a premises becomes more viable and may be further expanded to a large population of premises. In being able to identify the power-draw information using merely run-time and energy usage information, the various embodiments may be performed remotely and without prior information about the system and its installed location. Additionally, the information may be acquired in an on-going basis allowing for a more thorough and continuous assessment of the system's performance.

It is known that usage data from a utility meter may be analyzed to provide an aggregate amount of energy used for climate-control for a premises. However, such an estimate does not distinguish between a climate-control system drawing a large amount of power for a short time and drawing a small amount of power for a long time. Additionally, a usage log of a climate-control system (e.g., a programmable thermostat) may be used to identify the operational-schedule of the various states (e.g., heating, cooling, fan-only, off) of the system. However, the usage-log in itself is not correlated to the actual power-draw of the climate-control system within the various operation states.

To determine power-draw of a premises, the illustrative embodiment exploit a relationship between the runtime of a climate-control system and usage data (i.e., energy consumed). Specifically, the longer a system runs; the more energy it will consume. The illustrative embodiment correlates run-time data collected from a controller (e.g., a programmable communicating thermostat (PCT)) with the usage data collected by a utility meter (e.g., Smart or AMI Meter) to determine a representative power-draw for the climate-control system. The representative power-draw information may be compared overtime to determine if a climate-control system is operating properly.

FIG. 1 schematically illustrates a premises according to an illustrative embodiment. A climate-control system 102 (shown as a heating, ventilation, and air-conditioning system "HVAC (Load) 102") is shown in a premises 104 connected to a utility meter 106 (referred to as a "AMI meter 106"). A controller 108 (referred to as a "thermostat 108") regulates the operation of the climate-control system 102 in controlling the temperature, and possibly humidity, air-quality, and other environment conditions, within a controlled space of the premises 104. The utility meter 106 measures the energy usage (as energy usage data 114) of the premises 104. The premises 104 may have non-HVAC loads 110 (such as appliances) and may have an auxiliary environment conditioning system 112 (shown as "Aux Climate Control 112"). An auxiliary environment conditioning system 112 may be a window-installed air-conditioning or a space heating unit. Though such units may be used to control environment conditions within the premises, they generally are independently controlled and do not interface with the controller 108.

In the various embodiments, the utility usage data and operational data of climate-control system may be autonomously retrieved (i.e., without requiring a person to go to the system for the data retrieval) using a communicating meter and communicating controller located at the premises. In an embodiment, the run-time information and energy usage information may be acquired over a network. As such, a communicating thermostat may be employed to provide the run-time data 116 of the climate-control system 102. A communicating meter, such as an "advanced-meter infrastructure" (AMI) meter, may be employed to provide energy usage data 114 of the premises 104. Of course, the energy usage data 114 and operational data 116 of the climate-control system may also be manually retrieved.

Figure 2:
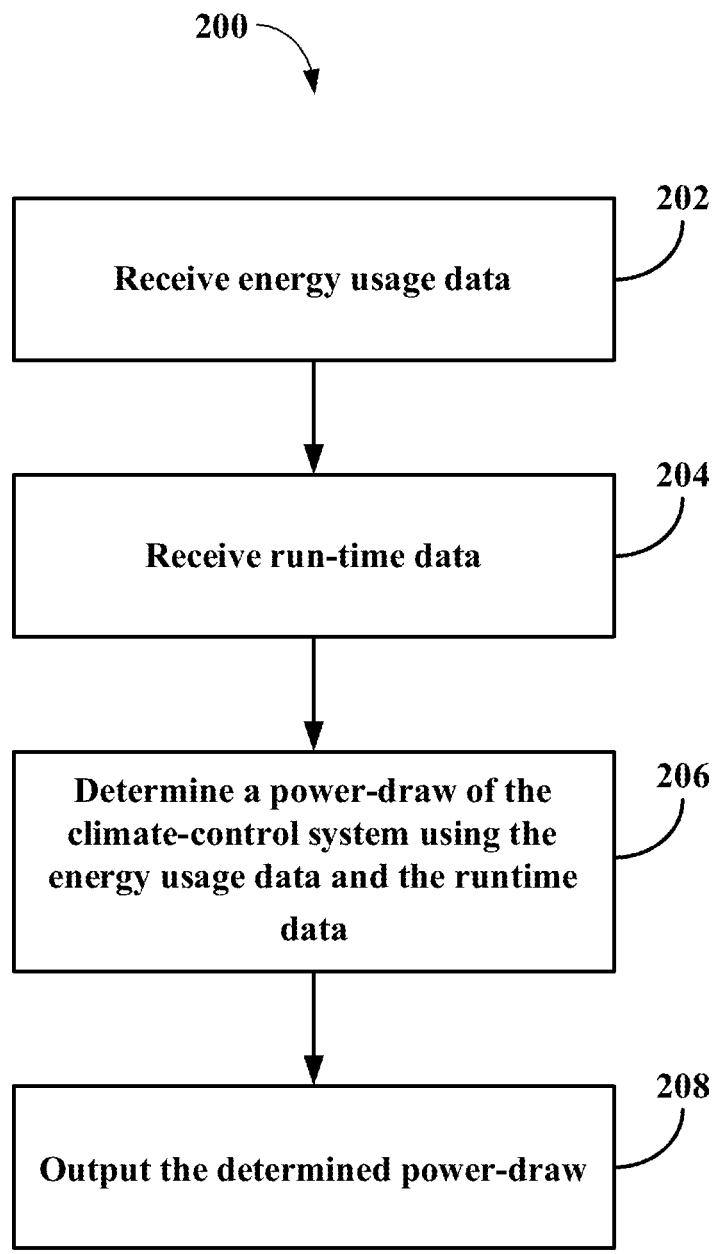
FIG. 2 shows a flowchart that schematically illustrates a computer-implemented method of determining power-draw to reduce energy usage at a premises according to an illustrative embodiment.

FIG. 2 shows a flowchart that schematically illustrates a computer-implemented method of determining power-draw according to an illustrative embodiment. A computer system receives the energy usage data 114 of the premises 104 (step 202). The energy usage data 114 may be in sub-hourly, hourly, daily, monthly, and seasonal increments and may correspond to various types of energy, such as electricity use or other types of energy, including heating oil, natural gas, and burning fuel (e.g., wood pellets).

The computer system also receives the run-time data 116 of the climate-control system 102 corresponding, in part, to the time period of the energy usage data 114 (step 204). The run-time information may correspond to the controls of the thermostat 108 in regulating, for example, the heating, cooling, or conditioning by the climate-control system 102. According to an embodiment, a communicating thermostat is employed at the premises 104 to acquire the run-time data 116. The run-time data 116 may include the "on-time", "off-time", or cycle-time (also referred to as "duty-cycle period") of the HVAC 102.

The "on-time" and "off-time" may correspond to a quantity within a period associated with the data measurement in which the climate control system 102 is either running or not running. For example, the run-time data 116 may be expressed in a time quantity, where each data has an associated time value (e.g., 0-60 minutes or 0-3600 seconds for a one-hour period). Alternatively, the run-time data may also be expressed as a percentage of the run-time period (e.g., 0-100% within a one-hour period). Hourly data may further be expressed as function of a counter employed within the controller 108. For example, a 15-bit counter has a range of 0 to 32767, and the period may correspond over the entire range of 0 to 32767, or a portion thereof (such as 0 to 3600). The example of hourly data is merely shown as an illustration, it should be appreciated that other periods may be employed, for example, minute, quarter-of-an-hour, half-an-hour, daily, weekly, and seasonal period. Various data format may be employed, include hexadecimal, binary, octal, integer, double, among others. Similarly, the energy usage data 114 may be expressed in such a format. For example, the energy-usage data may be expressed as a kilowatt quantity that may be expressed as an integer, a double, or a unit specified by a meter.

Figure 3:
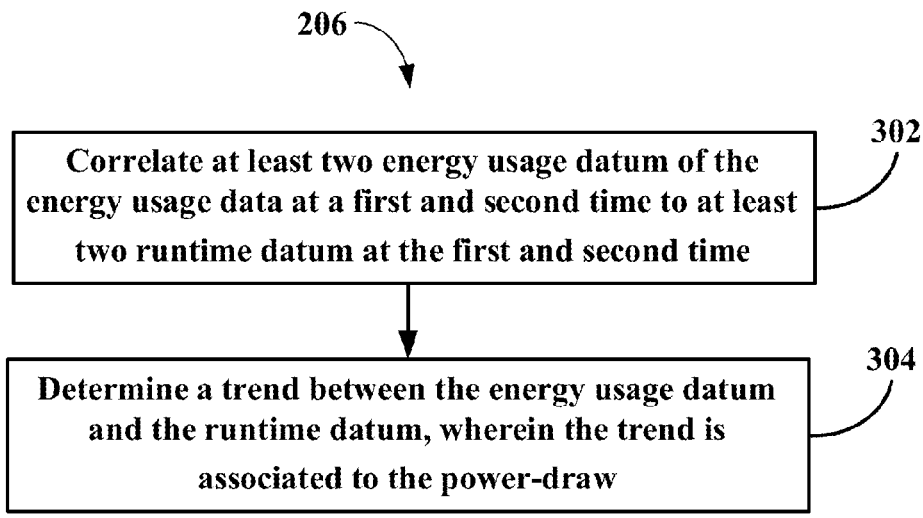
FIG. 3 shows a flowchart that schematically illustrates an operation of determining power-draw according to an illustrative embodiment.

Using the run-time data 116 and the energy-usage data 114, a computer system may determine the power draw information (step 206 of FIG. 2). Various methods may be employed in accordance with the illustrative embodiments. FIG. 3 shows a flowchart that schematically illustrates an operation of determining power-draw using the energy usage data 114 and run-time data 116 according to an embodiment. In FIG. 3, the step 206 may include correlating at least two energy usage datum of the energy usage data 114 to at two respective time periods to at least two run-time datum having at the same respective time periods (step 302). A trend of the correlation may be determined—the trend being associated with the power-draw (step 304). The correlation 302 and trending 304 may be part of a regression analysis. The computer-system may perform a verification operation to determine that the trend is accurate. According to the illustrative embodiment, a coefficient of determination ($R^2$) may be determined. The computer-system may consider the trend to be accurate if the $R^2$ value exceeds a pre-specified value, which may range from 0.1 to 1 on a scale of 0 to 1 where 1 corresponds to a perfect fit (i.e., no deviation).

Subsequent to or in lieu of a verification step, the computer-system may correlate additional usage datum of the energy usage data to additional corresponding run-time datum until improvements of the trend is below a pre-specified value. The improvement may be based, for example, on a moving-average window.

Figure 7:
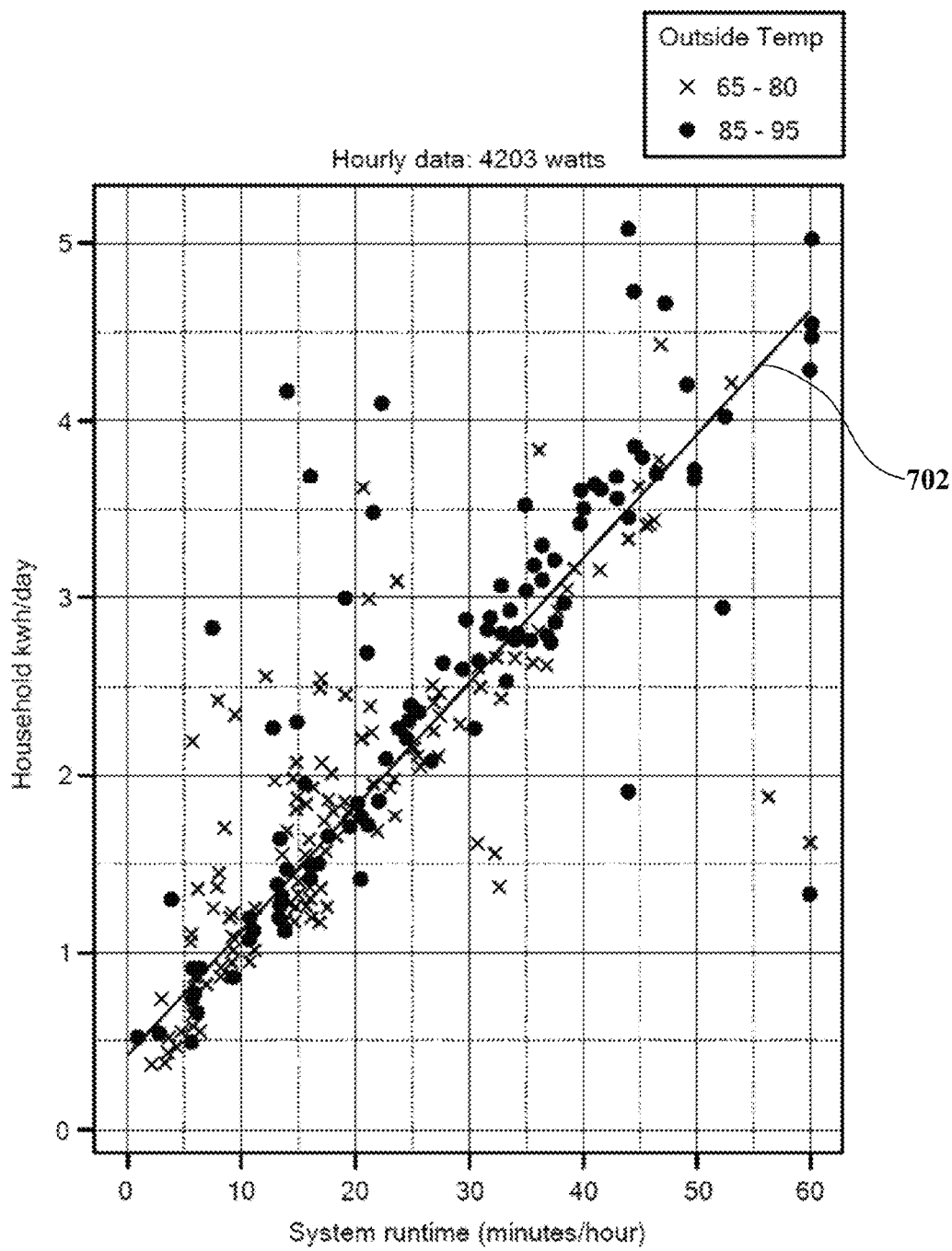
FIG. 7 is a plot of energy usage data of a single residential household and a method of determining power-draw therefrom according to an illustrative embodiment.

For a class of premises (such a single residential household with a single cooling system), linear regression may be employed to determine the power draw. FIG. 7 is a plot of energy usage data of a single residential household with a single-stage cooling system. The x-axis shows the runtime data (in minutes) of the cooling system in a given hour, and the y-axis shows the energy used at that hour (in kilowatt-hours). The data-points are shown clustered around the best fit line 702, which corresponds to the power-draw of the single-stage cooling system. Specifically, the slope of the best fit line 702 represents the power-draw (in kilowatts per hour) by the cooling system in the "on" state.

It is noted that the HVAC systems may have different efficiency operations depending on different outside temperatures. For example, a HVAC may use 4.0 kW when the outside temperature is 85 degrees (note that all references to temperature are in degrees Fahrenheit), but then may use 4.1 kW when the temperature is 95 degrees. As such, the trend 702 provides a representative characteristic of the power-draw.

The data points are plotted by respective outside temperatures that range from 65° F. to 95° F. Deviations from the best fit line may be explained by the presence of other devices that may consume energy coinciding with the climate-control system being"on". It is noted that in this data set, non-climate-control loads (not shown) varies from 0 to 4 kW. As such, if shown, it should show a distribution of points along the run-time x-axis at run-time value 0.

According to an embodiment, the power-draw may be determined as $$\left(\frac{1}{n}\sum x_i x_i^T\right)^{-1}\left(\frac{1}{n}\sum x_i y_i\right),$$

where $x_i$ is the run-time value at time i; $y_i$ is the energy usage data at time i; and n is the number of values used in the determination. The "time i" refers to an index in which the data (i.e., an energy usage datum and a run-time datum) may have a temporal association. As such, time i may be a time quantity or a counter quantity. Of course, other regression techniques may be employed including simple regression, ordinary least square, generalized linear model, discrete choice, logistic regression, multinomial logit, mixed logit, probit, multinomial probit, ordered logit, multilevel model, mixed model, multi-level model, fixed effects, random effects, non-parametric, semi-parametric, robust, quantile, isotonic, principal component, least angle, local, segmented, non-linear regression, Poisson, among others.

Figure 4:
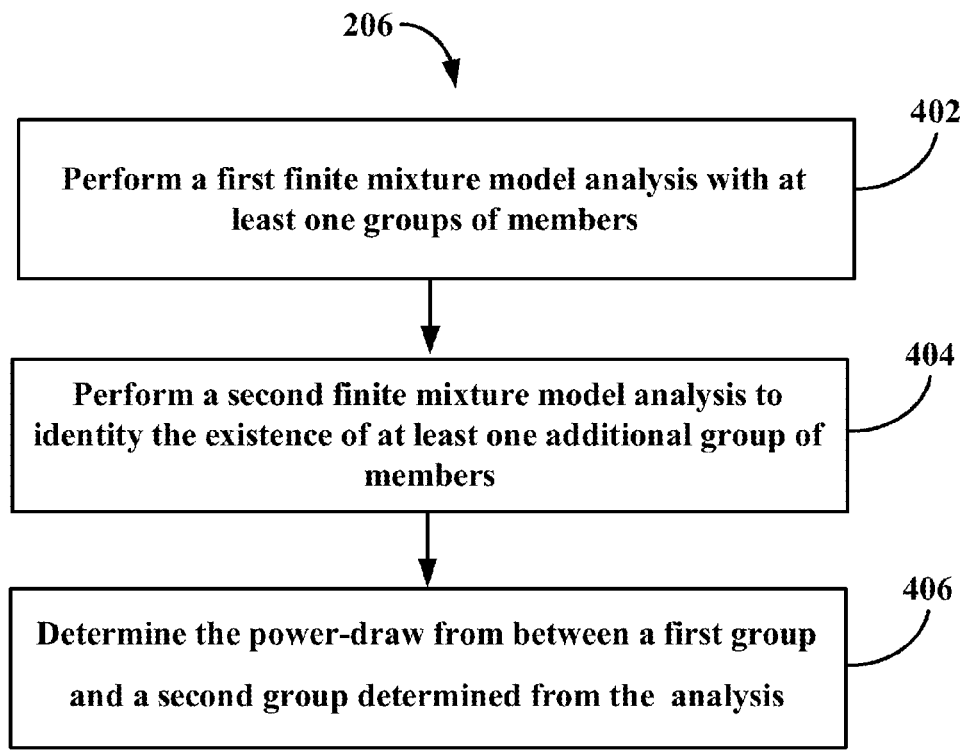
FIG. 4 shows a flowchart that schematically illustrates an operation of determining power-draw according to another illustrative embodiment.

According to another embodiment, the analysis may be performed without any knowledge of the premises. As such, the power draw may be determined with merely the energy usage data and the run-time data. FIG. 4 shows a flowchart that schematically illustrates an operation of determining power-draw according to another illustrative embodiment.

Figure 8:
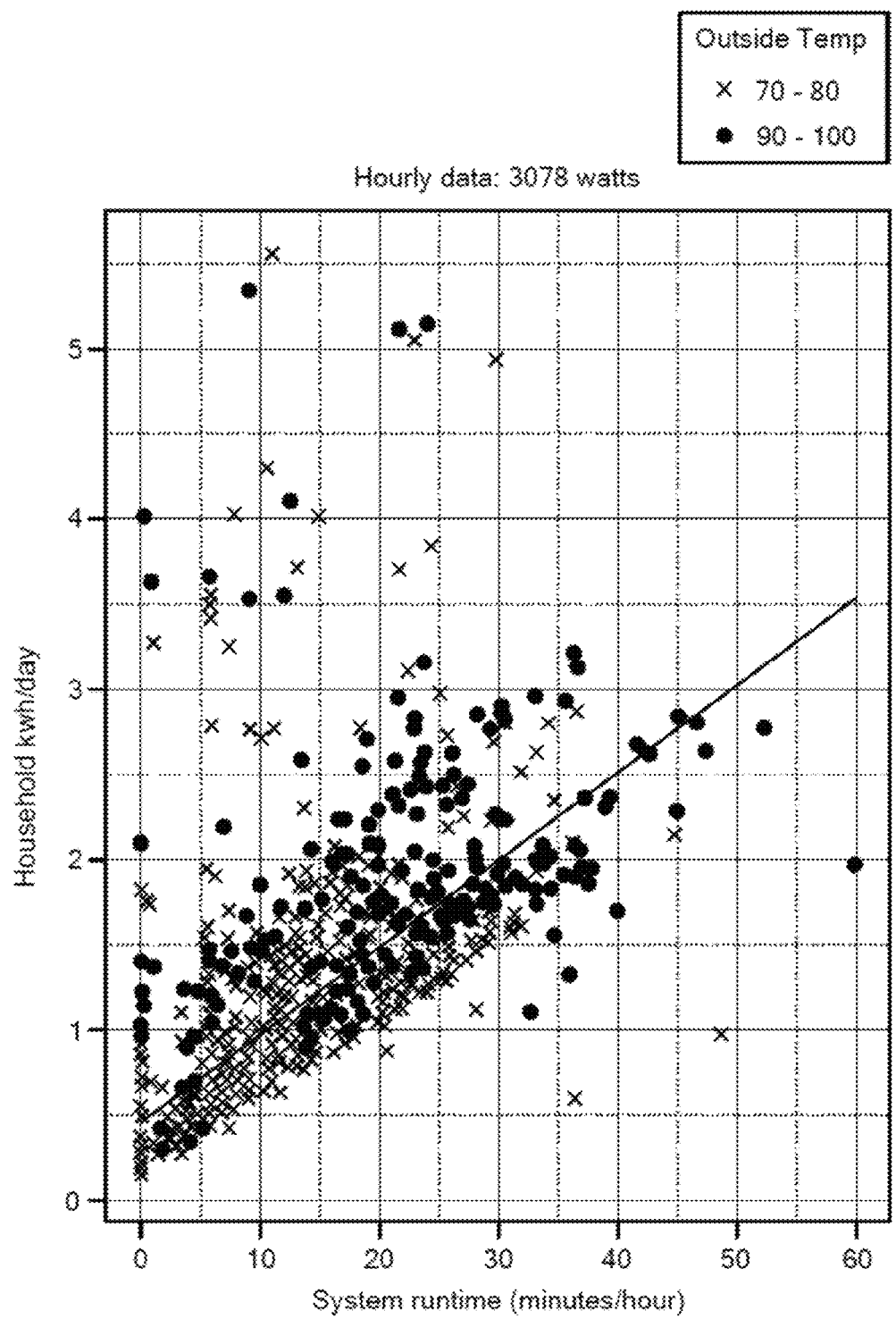
FIG. 8 is a plot of energy usage data of a single residential household having multiple climate-control systems operating at a premises.

FIG. 8 is a plot of energy usage data of a single residential household with a single-stage climate-control system and another energy-consuming devices operating in coincidence therewith. Such a scenario is common as an occupant of a premises may employ an auxiliary window air-conditioning or a spaced heating unit to augment the HVAC system. As shown in FIG. 8, the quality of the model fit is less clear (i.e., greater deviation from the best-fit line) as compared to FIG. 7.

The deviation may be explained based on the difference in the power-draw of the two systems. Additionally, the window air-conditioning unit is not controlled by the controller of the climate-control system (e.g., thermostat). Though acting independently, the auxiliary unit and the HVAC are correlated (i.e., the runtime and usage relationship are intertwined) in that they provide regulation to the same controlled space.

To determine the power-draw of a premises of FIG. 8, the illustrative embodiment may employ finite mixture models. The embodiment may model for two systems. Specifically, the embodiment may model the data with the assumption that there are two "states" or "modes." Mode #1 may be defined as the climate-control system being "ON" and the window air-conditioning system being "OFF." Mode #2 may be defined as the climate-control system being "ON" and the window air-conditioning system being "ON." The embodiment estimates the probability that each energy datum is in each of these two states, and then conditional on that probability of membership, estimates the underlying relationship between runtime and energy usage data.

The finite mixture model for a two-group model may be considered as solving different linear regression models concurrently while fitting a probability of membership in each group. A simple linear equation is shown in Equation 1, where $b_0$ is an offset and $b_1$ is a power-draw of run-time quantity "x" that results in (i.e., correlates to) energy usage "y".

$$y=b_0+b_1*x \quad \text{(Equation 1)}$$

A finite mixture model may perform the estimate twice where a first group may have the form $(b_{01}+b_{11}*x)$ and a second group may have the form $(b02+b12*x)$. As such, the model may be expressed as Equation 2, where $w_1$ and $w_2$ are weighing parameters.

$$y=w_1*(b_{01}+b_{11}*x)+w_2*(b_{02}+b_{12}*x) \quad \text{(Equation 2)}$$

Linear regression has a closed form solution in that a matrix equation provides a "best" fit (i.e., $b_o$ and $b_1$ of Equation 1). The finite mixture model regression has an open form and potentially has an infinite number of "best" $b_0$ and $b_1$ parameters. The parameters may have the form $b0_{[1 \ldots n]}$ and $b_{1[1 \ldots n]}$ as shown in Equation 2 for a group of two, where n is the number of groups. The finite mixture model then employs an estimation to select the best $b_0$ and $b_1$ parameters. According to an embodiment, an expectation-maximization estimation is employed to select the "best" offset (e.g., $b_0$, $b_{01}$, $b_{02}$), power-draw (e.g., $b_1$, $b_{11}$, $b_{12}$), and weighs (e.g., $w_1$, $w_2$). Various finite mixture models may be employed including standard linear models, generalized linear models, and model-based clustering. Various types of estimation may be used, such as a least-square estimation, a generalized least-square estimation, an iteratively reweighted least-square estimation, a total least-square estimation, a maximum-likelihood estimation, a ridge-regression estimation, a least absolute deviation estimation, an adaptive estimation, a principal-component regression estimation, and a least-angle regression estimation.

In an embodiment, the finite mixture model may be implemented using the expectation-maximization algorithm, such as employed by the FlexMix package as disclosed in Friedrich Leisch, *FlexMix: A General Framework for Finite Mixture Models and Latent Class Regression in R*, 11 Journal of Statistical Software 8 (October 2004) and the Appended FlexMix manual in U.S. Provisional Application No. 61/713,740, which are incorporated herein in their entirety. The FlexMix package implements a general framework for finite mixtures of regression models using the expectation-maximization algorithm. It provides the expectation-step and the data handling while allowing the user to supply the maximization-step to define a model.

Figure 9:
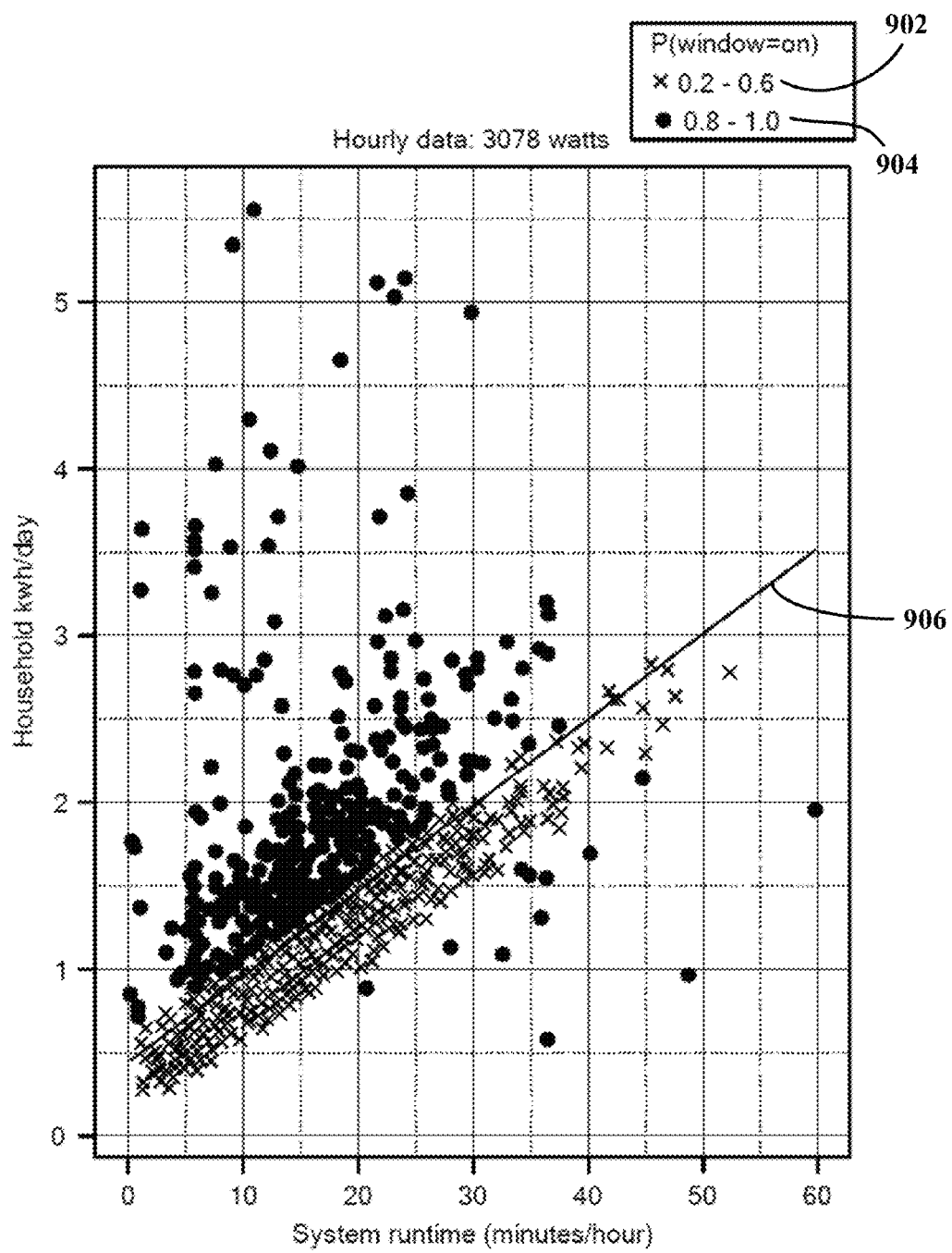
FIG. 9 is a plot of the energy usage data of FIG. 8 analyzed using a finite mixture model according to an illustrative embodiment.

FIG. 9 is a plot of the energy usage data of FIG. 8 analyzed using a finite mixture model according to an illustrative embodiment. The "cross" data-points 902 show a low probability (P) of a window air-conditioning system being "on" while the "dot" data-points 904 show a high probability. As such, data-points 902 may correspond to the HVAC system, while the data-points 904 may correspond to the window air-conditioning unit or other loads. A trend line 906 is determined based on both datasets 902, 904, where each point is weighted based on its probability value (P). The slope of the best-fit line 906 represents the representative power-draw of the climate-control system. As such, the computer-system does not need to determine the presence of a window air-conditioning system. The computer-system may perform a verification operation to determine that the power-draw is accurate. As discussed, a coefficient of determination ($R^2$) may be determined for the trend.

Alternatively, multiple finite mixture model analysis may be performed having varying numbers of groups of memberships to determine the power-draw. The computer-system may perform a first finite mixture model analysis with at least two groups of memberships. The computer-system may determine if the power-draw is sufficiently accurate in that the $R^2$ value is within a pre-specified range. In the scenario that it is not, the computer-system may perform a second finite-mixture model analysis with additional groups of members. For example, the system may perform a first analysis with two-groups and then a second analysis with three or more.

In another embodiment, the computer-system may perform a first finite mixture analysis with at least two groups to determine a trend result. Concurrently or in sequence with the first analysis, the computer system may perform a second finite mixture model analysis with a different number of groups of members to identify the presence or existence of a second or third, or nth group within the data. The system then determines the power-draw from between a first group and a second group determined from the analysis. The determination may be based on the best fit, such as a higher $R^2$ value.

In another embodiment, multiple finite mixture model analysis may be performed concurrently, and the best fit trend is then selected from among the derived results as the power-draw. In such embodiments, each finite mixture model may be weighted or penalized based on the number of group of memberships used in the analysis. Alternatively, the determination may also be based on a comparison with historical trend data. For example, a derived trend that is more similar to a recent historical trend may be selected.

The method of using multiple finite mixture models, as described above, may be employed to detect the presence of various loads within the premises. As discussed, various other loads may include auxiliary climate control systems 112 (such as supplemental heating-units or windowed air-conditioning units) and appliances (non-HVAC loads) 110.

Additionally, an embodiment may employ finite mixture models to determine the power-draw of a climate-control system at a premises at different stages of operations. For example, a HVAC may have a fan-only mode (stage 1) or a cooling mode that includes the fan and the compression (stage 2). The finite mixture model analysis may be performed considering each stage as a group using the method described above. Similarly, the HVAC may have a fan-only mode (stage 1) and a heating mode that includes the fan and the heater (stage 2). Additionally, heating systems may have auxiliary-heating mechanisms that use resistance coils to warm the air in very cold conditions. The heating system consumes more energy in the auxiliary mode than during regular operations. The various embodiments may be employed to identify such modes.

In another alternative embodiment, the computer system may perform a linear regression analysis and then perform a finite mixture model analysis if the $R^2$ value of the linear regression analysis is below a specified value.

It should be appreciated that the various embodiments may employ the mixture models with various statistical tools to select the model with the appropriate number of states or modes. The embodiments may employ a statistical tool, such as Akaike information criterion ("AIC") or Bayesian information criterion ("BIC").

Figure 10:
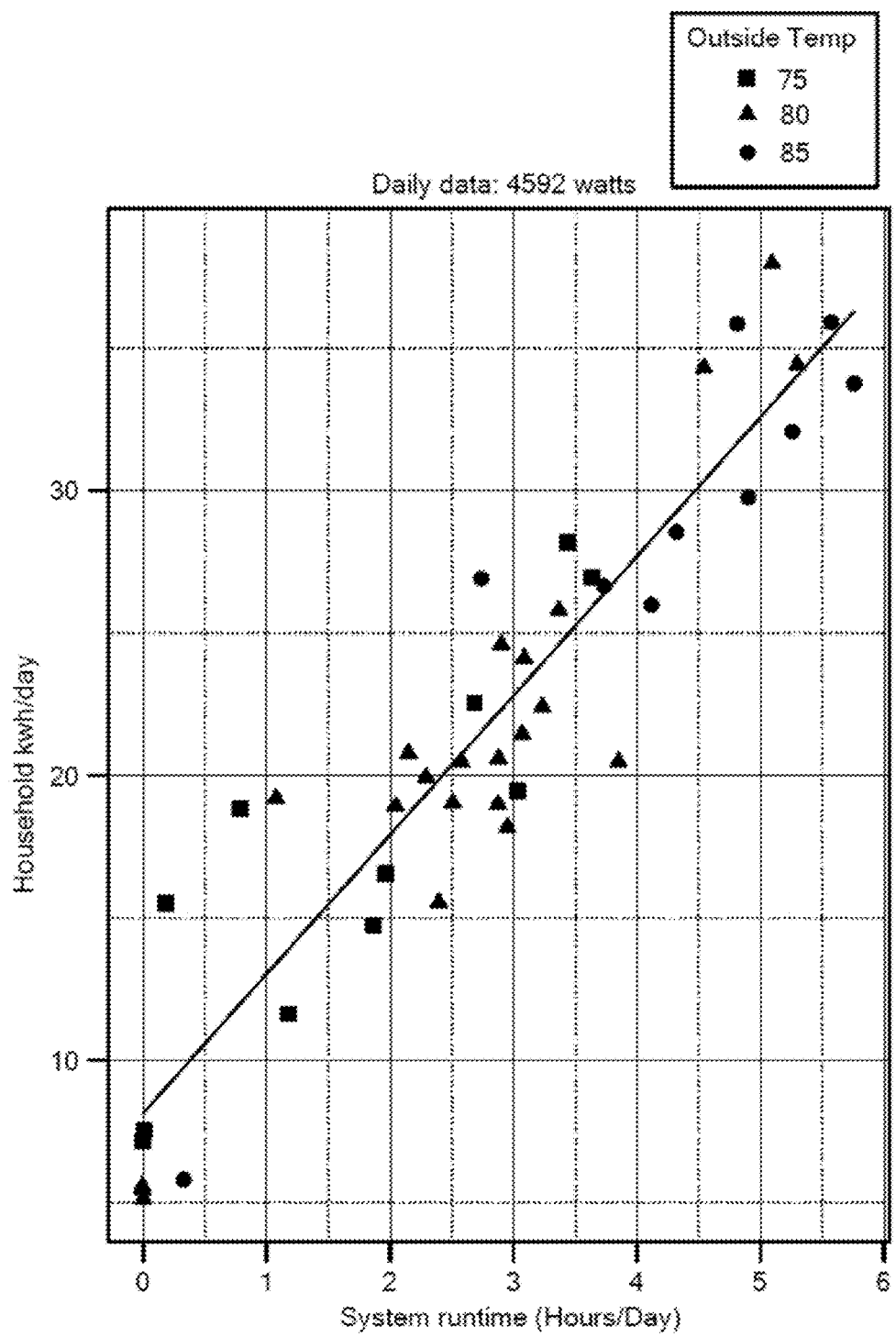
FIG. 10 is a plot of energy usage data of FIG. 7 in daily increment and a method of determining power-draw therefrom according to an embodiment.

In another aspect of the various embodiments, the embodiments may be employed with various resolutions of utility data, including hourly, daily, and/or monthly. FIG. 10 is a plot of the energy usage data of FIG. 7 having daily energy-usage data rather than hourly data. As seen in FIG. 10, the results are qualitatively similar to FIG. 7. Specifically, the data-points are tightly clustered around the best-fit line (i.e., low deviation). Although the estimated slope of the daily data is higher than with the hourly data, the two estimates are within approximately ten percent (10%) of one another. Specifically, the estimated power-draw using hourly data is approximately 4.2 kWh while the estimated power-draw using daily data is approximately 4.6 kWh. As a result, with sufficient historical data, the various embodiments may be employed for daily, weekly, and seasonal resolutions of utility usage data.

Figure 11:
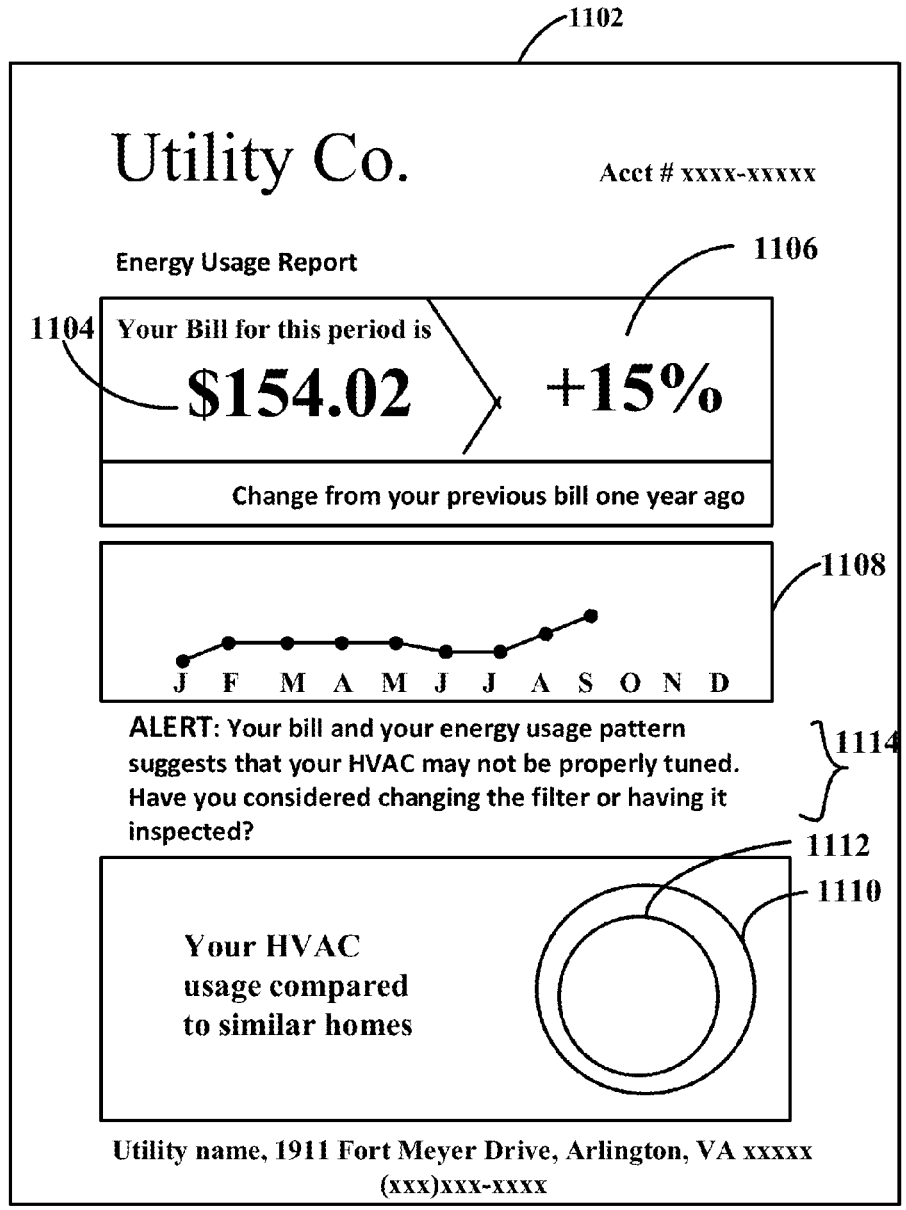
FIG. 11 is a diagram of a report generated using the power-draw according to an illustrative embodiment.

Referring back to FIG. 2, the computer-system may output the determined power-draw (step 208) to reduce energy usage at the premises. In an embodiment, the computer system may output the determined power-draw in a report to the occupant of the premises or an entity interested in the information, such as the utility company providing service to the premises. FIG. 11 is a diagram of a report 1102 having the power draw information. The report may include a bill amount 1104 for the current bill cycle as well as a change 1106 in the bill from the previous year. The power-draw information may be shown as a plot 1108 of the HVAC power-draw over time. An occupant of the premises may infer that the HVAC may require maintenance from the plot 1108.

The report 1102 may also include an analysis of the power-draw information. If the HVAC operating characteristic (i.e., power-draw) changes above a pre-specified value, the system may include a message 1114 to suggest to the occupant to have the HVAC inspected or to provide maintenance (such as changing an air filter).

The report 1102 may also include an analysis of the power draw information of the climate-control system at the premises (see circle 1110) and other similar premises (1112). Here, the power-draw of the premises 1110 is shown being greater than the average power-draw 1112 of a group of neighbors having similar household. A method of determining similar premises is disclosed in U.S. Patent Publication No. 2012/0310708 having the title "Method and System for Selecting Similar Consumers." The application is incorporated herein by reference in its entirety.

Figure 5:
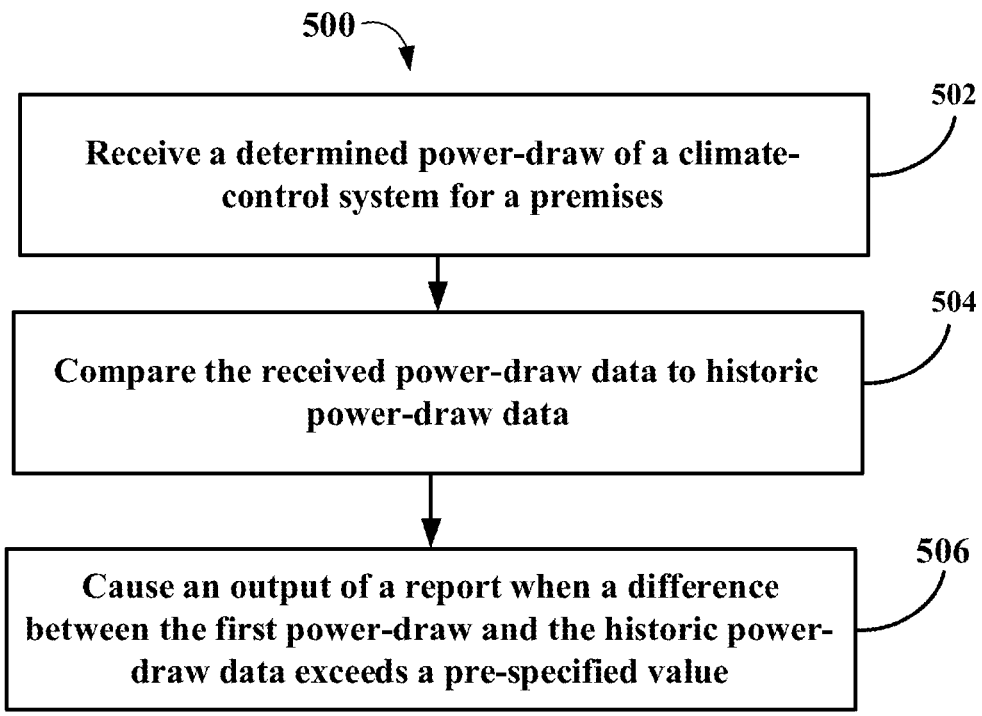
FIG. 5 shows a flowchart that schematically illustrates usage of the power-draw determination to reduce energy usage at a premises according to an embodiment.
Figure 6:
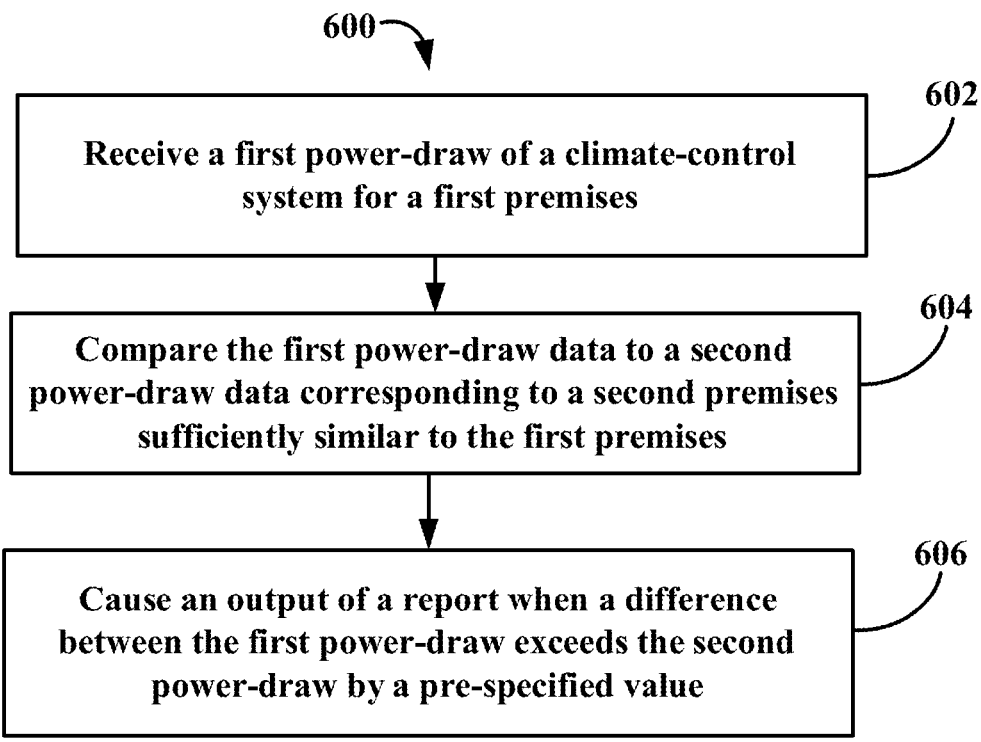
FIG. 6 shows a flowchart that schematically illustrates usage of the power-draw determination to reduce energy usage at a premises according to another embodiment.

FIGS. 5 and 6 show flowcharts that schematically illustrate usage of the power-draw to reduce energy usage at a premises according to an embodiment. In FIG. 5, a computer system receives a determined power-draw information of a climate-control system of a premises (step 502). The computer-system compares the power-draw data to historical power-draw data that correspond to a similar month or season (step 504). Upon a difference from the comparison exceeding a pre-specified value, the computer-system may generate the report or may send a notification to a reporting service to notify the consumer (step 506). The report may be send via a communications network which may be the Internet. The computer system may send the report in an electronic mail or make it available on a server-supported website for the customer to log into view. The computer system may publish the report or provide the information to a publishing system so that the power-draw data may be provided to the customers via regular mail (e.g., as part of a utility bill). The report may also be communicated to the utility company to provide to the consumers. The utility company may send alerts to the customers using the power-draw information.

In FIG. 6, a computer system receives a determined power-draw information of a climate-control system of a first premises (step 602). The computer-system compares the power-draw data of the first premises with the power-draw data of the second premises sufficiently similar to the first premises (step 604). Upon a difference between the comparison exceeding a pre-specified value, the computer-system may generate the report or may send a notification to a reporting service to notify the consumer (step 606).

Various usage of power-draw has been contemplated. In another embodiment, the power-draw information may be used to optimize power usage at the premises. More specifically, customers at their premises may optimize their climate-control systems to minimize the energy consumed or the cost for such consumption. For example, on a particular day, a utility company may broadcast a peak-day-pricing scheme that indicates a price increase for the day between 2 p.m. and 7 p.m. It may be desirable to operate the climate-control system for longer periods of time (i.e., pre-cool) in anticipation of the higher pricing scheme. The power-demand information may be used to estimate the pre-cooling, such as when to begin the pre-cooling and the degree of pre-cooling that should be performed, to maintain the premises within the customer's desired climate range.

Additionally, power-demand information may be paired with thermodynamic models of the premises to ascertain premises equipped with undersized or oversized climate-control system. Thermodynamic models of the premises may include characteristic information, such as heating and cooling rates, time-to-heat/cool and thermal drift rate of the premises. A system may compare the power-demand information with the thermodynamic models of the premises, including the efficiencies of a heating and cooling system.

Additionally, the power-demand information may be used in conjunction with thermodynamic models of a premises to determine the efficiency of a premises. The efficiency information may be used as measurement standards, including the seasonal energy efficiency ratio (SEER). The efficiency information may be used to differentiate between premises with poor building envelopes and premises with leaky ducts.

Additionally, the power-draw information may be aggregated over a large population of residential buildings. The aggregation may be used as a normative comparison to determine similar homes for various other comparisons.

Additionally, power-draw information may be employed in demand response programs, including identifying potential candidate premises for such programs.

Figure 12:
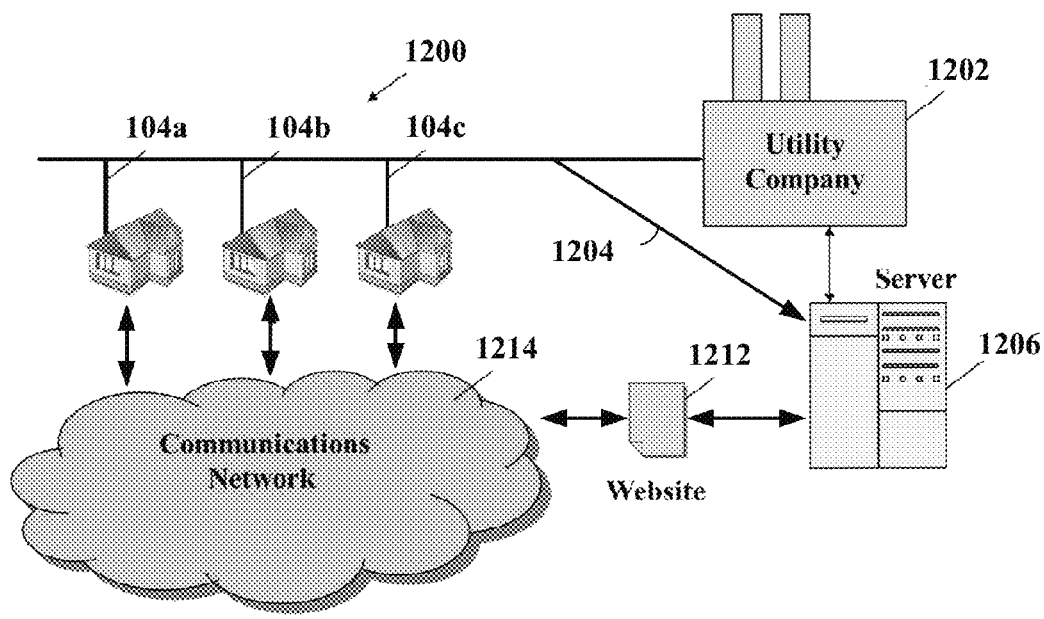
FIG. 12 illustratively shows a system that utilizes the methods according to the various embodiments.

FIG. 12 is a schematic block diagram of the premises 104 of FIG. 1 in a system 1200 according to the various embodiments. The utility 1202 collects data 1204 from the premises 104a-104c. The data 1204 may include the energy usage data 114 and the run-time data 116. A computer system 1206 (shown as "server 206") may receive the data 1204 from a utility 1202. The computer system 1206 may perform a computer-implemented method to determine the power-draw of the premises 104a-104c. The computer system 1206 may communicate the power-draw information 1208 to customers associated with the premises 104a-104b.

Figure 13:
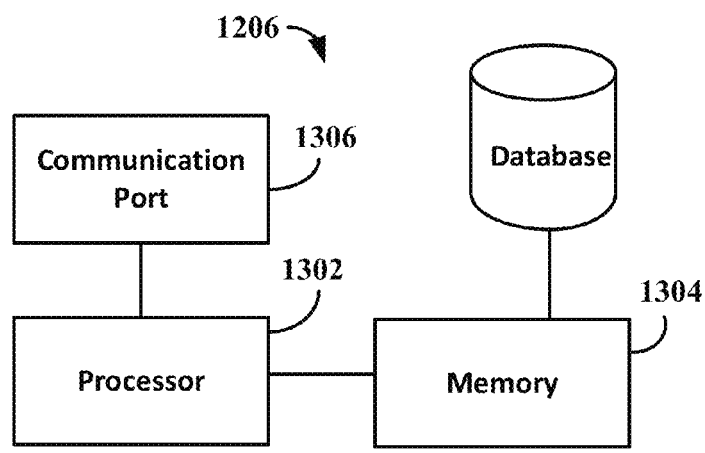
FIG. 13 is a diagram of a computer system according to an illustrative embodiment.

FIG. 13 schematically illustrates a computer system 1206 of FIG. 12 according to the various embodiments. The computer system may include a processor 1302, a memory 1304, and a communication port 1306. The memory 1304 may maintain a database 1308 to store the energy usage data 114 and the run-time data 116. The communication port 1306 may be configured to interface with the utility company 1202 to receive the data 1204 therefrom and to provide the power-draw data 1208. The communication port 1306 may interface to the premises 104a-104c to receive the data 1204. The interface may be through a network (not shown).

The communication ports may be configured to interface to the Internet via a local area network. Alternatively, the various communication ports may be implemented on several servers that interface to the respective networks. For example, the communication port may be a server that interfaces to utility meter. One example is a gateway FTP server to interface with utilities servers to allow for the transfer of data files. The communication port may be implemented as an exchange server, such as UUA for short message service (SMS) gateways, electronic mail (email) using simple mail transfer protocol (SMTP), as well as interactive voice response (IVR). Application programming interface (API) may, for example, be used to control IVR and SMS.

The various embodiments may employ additional variables to improve the reliability and accuracy of the determination. For example, additional variables may be employed to distinguish between different usage-time periods, including weekdays and weekends. Similarly, additional variables may be employed for temperature data, humidity data, wind speed and direction data, elevation data, weather data, and solar insolation data to account for different climate-control system efficiencies at different operating conditions.

It should be noted that other embodiments of acquiring the energy usage data and run-time data maybe employed. For example, auxiliary sensors may be employed at the thermostat to records it controls to the HVAC system. The information may be stored for subsequent retrieval and/or may be communicated through a communication channel to an external processing unit to perform the analysis.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

The various components of the control program may be implemented individually or in combination. For example, each component may be implemented or a dedicated server or a set of servers configured in a distributed manner.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computer-implemented method of determining power-demand of a climate-control system at a premises to reduce energy usage at the premises, the computer-implemented method comprising:

receiving energy usage data of the premises including energy usage of the climate-control system, the energy usage data corresponding to a usage time period;

receiving run-time data of the climate-control system corresponding to the usage time period, and determining from the run-time data one or more on-times that indicate when the climate-control system was running and one or more off-times that indicate when the climate-control system was not running;

determining a power-draw of the climate-control system using the energy usage data and the run-time data by correlating at least two energy usage datum of the energy usage data at a first and second time to at least two run-time datum at the first and second time, wherein the correlating produces a trend that represents the power-draw;

wherein determining the power-draw of the climate control system includes:

performing an analysis with at least two groups of memberships, including a first group corresponding to the climate-control system and a second group corresponding to a different energy usage unit, to provide a first trend corresponding to the climate-control system, wherein the first analysis includes a first finite mixture model analysis of the energy usage data and the run-time data;

performing additional analysis, including a second analysis, wherein each analysis includes at least one additional group of memberships corresponding to a likelihood of an additional different energy usage unit, wherein each analysis providing an additional trend corresponding to the climate-control system, and wherein each additional analysis includes a finite mixture model analysis of the energy usage data and the run-time data; and determining the power-draw of the climate-control system as a trend selected among the groups of the analysis, wherein the selection is based on a coefficient of determination ($R^2$) value derived from the trends.

2. The computer-implemented method of claim 1, wherein the trend is determined based on at least one of a least-square estimation, a generalized least-square estimation, an iteratively reweighted least-square estimation, a total least-square estimation, a maximum-likelihood estimation, a ridge-regression estimation, a least absolute deviation estimation, an adaptive estimation, a principal-component regression estimation, and a least-angle regression estimation.

3. The computer-implemented method of claim 1, wherein the power-draw is determined by $$\left(\frac{1}{n}\sum x_i x_i^T\right)^{-1}\left(\frac{1}{n}\sum x_i y_i\right),$$

where $x_i$ is a vector of the run-time data having n elements referenced by i; $x_i^T$ is the vector $x_i$ transposed; and $y_i$ is a vector of energy usage data having n elements and referenced by i.

4. The computer-implemented method of claim 1, further comprising, after the verifying
correlating additional usage datum of the energy usage data to additional corresponding run-time datum until improvements of the trend is below a pre-specified value.

5. The computer-implemented method of claim 1, wherein the premises includes a second climate-control system operating independently of the climate-control system, the operation of determining the power-draw of the climate-control system includes:
determining a second trend associated with a group of datum within the energy usage data correlated to the run-time data wherein the second trend is associated to the power-draw of the climate-control system; and
determining a presence of a second group of datum within the energy usage data not correlated to the run-time data.

6. The computer-implemented method of claim 1, wherein the premises includes a second climate-control system operating independently of the climate-control system, the operation of determining the power-draw of the climate-control system includes:
determining a second trend associated with a group of datum within the energy usage data correlated to the run-time data, each datum of the energy usage data having a probability of membership associated with being in the group, the trend being determined in a manner that fits the probability of membership,
wherein the trend is associated to the power-draw of the climate-control system.

7. The computer-implemented method of claim 1, wherein determining the power-draw of the climate-control system is based on a finite mixture model analysis of the energy usage data and the run-time data.

8. The computer-implemented method of claim 1, wherein the additional trend of each additional analysis is weighted, wherein the weight is associated to a number of additional group of memberships.

9. The computer-implemented method of claim 5, wherein the climate-control system includes a heating-ventilation and air-conditioning system of the premises, and the second climate-control system includes at least one of an auxiliary air-conditioning system and a space heating unit located within the premises.

10. The computer-implemented method of claim 5, wherein the climate-control system is regulated by a thermostat providing the runtime data.

11. The computer-implemented method of claim 1 further comprising:
receiving the determined power-draw for the premises as a current power-draw data;
comparing the received power-draw data to historical power-draw data, the historical power-draw data preceding the current power-draw data in time; and
causing an output of a report when a difference between the current power-draw and the historical power-draw exceeds a pre-specified value.

12. The computer-implemented method of claim 1 further comprising:
receiving the determined power-draw for the premises as a first power-draw data;
comparing the received power-draw data to a second power-draw data corresponding a second premises sufficiently similar to the premises; and
causing an output of an report when the first power-draw exceeds the second power-draw by a pre-specified value.

13. The computer-implemented method of claim 1, wherein the energy usage data includes at least one of hourly usage data, sub-hourly usage data, daily usage data, weekly usage data, and seasonable usage data.

14. A non-transitory machine-readable medium comprising program code stored thereon and executable by at least a processor of a computer to cause the computer to determine a power-demand of a climate-control system at a premises to reduce usage of energy at the premises, the non-transitory machine-readable medium comprising:
computer code that when executed by at least the processor cause the processor to receive energy usage data of the premises for a time period, the energy usage data including energy usage by the climate-control system;
computer code that when executed by at least the processor cause the processor to receive runtime data of the climate-control system for a portion of the time period, and to determine from the runtime data one or more on-times that indicate when the climate-control system was running and one or more off-times that indicate when the climate-control system was not running;
computer code that when executed by at least the processor cause the processor to determine a power-draw of the climate-control system using the energy usage data and the runtime data by correlating at least two energy usage datum of the energy usage data at a first and second time to at least two run-time datum at the first and second time, wherein the correlating produces a trend that represents the power-draw;
wherein determining the power-draw of the climate control system includes:
performing an analysis with at least two groups of memberships, including a first group corresponding to the climate-control system and a second group corresponding to a different energy usage unit, to provide a first trend corresponding to the climate-control system, wherein the first analysis includes a first finite mixture model analysis of the energy usage data and the run-time data;
performing additional analysis, including a second analysis, wherein each analysis includes at least one additional group of memberships corresponding to a likelihood of an additional different energy usage unit, wherein each analysis provides an additional trend corresponding to the climate-control system, and wherein each additional analysis includes a finite mixture model analysis of the energy usage data and the run-time data; and determining the power-draw of the climate-control system as a trend selected among the groups of the analysis, wherein the selection is based on a coefficient of determination ($R^2$) value derived from the trends.

15. A system comprising:

a memory configured to store i) energy usage data of a premises for a time period and ii) runtime data of a climate-control system of the premises for a portion of the time period;

a non-transitory machine readable medium comprising a control program stored thereon including instructions that when executed by at least a processor cause the processor:

control the memory to (i) receive the energy usage data for a portion of the time period; and (ii) receive the runtime data, a portion of the runtime data having times corresponding to the time of the energy usage data;

determine from the run-time data one or more on-times that indicate when the climate-control system was running and one or more off-times that indicate when the climate-control system was not running;

determine a power-draw of the climate-control system using the energy usage data and the run-time data including the on-times and the off-times by correlating at least two energy usage datum of the energy usage data at a first time and a second time to at least two run-time datum at the first time and the second time, wherein the correlating produces a trend that represents the power-draw, the power-draw being associated to a pre-specified relationship between a portion of the energy usage data and a portion of the runtime data;

wherein determining the power-draw of the climate control system includes:

performing an analysis with at least two groups of memberships, including a first group corresponding to the climate-control system and a second group corresponding to a different energy usage unit, to provide a first trend corresponding to the climate-control system, wherein the first analysis includes a first finite mixture model analysis of the energy usage data and the run-time data;

performing additional analysis, including a second analysis, wherein each analysis includes at least one additional group of memberships corresponding to a likelihood of an additional different energy usage unit, wherein each analysis provides an additional trend corresponding to the climate-control system, and wherein each additional analysis includes a finite mixture model analysis of the energy usage data and the run-time data; and determining the power-draw of the climate-control system as a trend selected among the groups of the analysis, wherein the selection is based on a coefficient of determination ($R^2$) value derived from the trends.

* * * * *